United States Patent [19]

Johnson

[11] 4,124,336
[45] Nov. 7, 1978

[54] POPPET CHECK VALVE FOR CONTROLLED FEEDING OF BLOWING AGENT

[75] Inventor: David E. Johnson, Macedon, N.Y.

[73] Assignee: Mobil Oil Corporation, New York, N.Y.

[21] Appl. No.: 797,976

[22] Filed: May 18, 1977

[51] Int. Cl.² ............................................. B29D 27/00
[52] U.S. Cl. .................................... 425/4 C; 251/333; 251/337; 264/DIG. 5; 264/211; 425/376 R; 425/817 C
[58] Field of Search .................... 264/53, 211, DIG. 5; 137/498, 499, 514.7; 425/4 R, 817 R, 4 C, 817 C, 131.1, 462, 376 R; 251/82, 83, 337, 333, 321, 322, 323, 336; 366/79, 102, 168

[56] References Cited

U.S. PATENT DOCUMENTS 3,396,743  8/1968  Mackal et al. .................... 251/333 X
3,658,973  4/1972  Aykanian ..................... 425/817 C X

FOREIGN PATENT DOCUMENTS 2,302,906  7/1974  Fed. Rep. of Germany .......... 425/4 R
2,644,198  3/1977  Fed. Rep. of Germany ... 425/817 R X Primary Examiner—J. Howard Flint, Jr.
Assistant Examiner—Mark Rosenbaum
Attorney, Agent, or Firm—Charles A. Huggett; Ronald J. Cier

[57] ABSTRACT

A poppet type check valve for controlled feeding of blowing agent into an assembly for the extrusion of thermoplastic polymeric foam material and, in particular, for controlled feeding of a blowing agent such as pentane into the barrel of an extruder assembly for extrusion of polystyrene foam; and an apparatus assembly comprising such a check valve in combination with the barrel of an extruder for extrusion of such foam materials.

11 Claims, 3 Drawing Figures

POPPET CHECK VALVE FOR CONTROLLED FEEDING OF BLOWING AGENT

BACKGROUND OF THE INVENTION

1. Field of the Invention

This invention is related to a check valve of the poppet type, and its use in combination with an extruder, for the controlled feeding of a blowing agent into the barrel of an extruder for the extrusion of a polymeric foam resin, e.g. foam polystyrene.

2. Description of the Prior Art

Various apparatus for producing foamed plastic resin articles are known and used in the plastics industry. One such apparatus comprises an extruder including a barrel through which a thermoplastic resin is fed while being melted, an exit head to extrude the molten resin from the barrel to a relatively low pressure area such as the atmosphere, and a fluid injection means to inject a pressurized expandable fluid into the barrel. The fluid, or "blowing agent" as it is called in the industry, is mixed with the molten resin under pressure in the barrel and, when the mixture is extruded out of the barrel into the lower atmospheric pressure environment on the outside of the apparatus, the fluid expands causing the resin to form a foam having the shape and characteristics dictated by the extrusion head and the composition of the resin.

The injection of the blowing agent into the molten resin within the barrel of the apparatus often causes some special problems and resort has been made to the use of one-way check valves in the fluid injection lines to prevent backflow of the resin from the barrel of the extruder into the fluid injection line, the occurrence of which requires subsequent shut-down of the apparatus to remove the blockage. One such type of check valve that has been used in thermoplastic foam extruders comprises a housing having an enlarged internal chamber with fluid feed inlet means at one end portion and fluid outlet means on the other end thereof [see FIG. 2]. Within the enlarged chamber is a spring-loaded ball bearing which acts as the check valve. The arrangement is such that, when there is no fluid pressure in the lines, the spring presses the ball bearing firmly against a restriction constituting the fluid entry port of the valve and thereby prevents any flow either into or out of the valve. When the fluid pressure in the lines is increased to the point where its exerts a force on the ball which is greater then the force exerted by the combined action of the spring and the internal pressure of the apparatus, it will cause the ball to move away from the restriction thereby allowing the fluid to flow around it, through the check valve assembly, and into the barrel of the extrusion apparatus where it is mixed with the resin. In such a ball-bearing type valve, if the force of the fluid pressure within the lines should fall below the combined forces of the spring and the internal pressure of the apparatus acting on the ball, or if there should be a sudden surge of pressure within the apparatus which is greater then the fluid injection pressure, the ball bearing will once again be pressed against its seat and thereby prevent the flow of molten resin through the valve and into the fluid line.

The traditional shutdown procedure for a foam extrusion unit such as described is to sequentially valve off the resin feed line, bleed the molten resin out of unit, and turn off the heaters on the barrel of the extruder and on the fluid (blowing agent) feed line. The blowing agent feed line, which had been kept cool by the fluid flow during the extrusion operation, is warmed by the hot extruder causing the fluid (blowing agent) to expand from the throttling valve through the body of the check valve. The low boiling points of the fluids normally used as blowing agents (e.g. pentane, $N_2$, Ne, Ar, He) allows them to boil off and completely empty the fluid from the valve into the empty extruder barrel. In that event, if the check valve leaks slightly there will be a small but relatively constant flow of fluid through the valve and into the barrel. If the check valve is tight, the spring pressure causes it to function as a pressure relief valve, in which case most of the fluid feed line would remain full but the check valve would be emptied. In either case, problems may be encountered during start-up and use of the unit which could cause considerable down-time for repair.

To put the extrusion unit back into operation after it has been shut-down and allowed to cool, the heaters are normally turned on before start-up for a sufficient time to allow the extruder barrel, the check valve and other parts of the assembly to reach operating temperature. The extruder drive is then started and resin progresses through the barrel, where it is melted, and into the empty ball-type check valve. The blowing agent feed is turned on and immediately cools and solidifies the molten resin within the body of the ball-type valve, thereby inhibiting passage of the blowing agent through the small metering orifice and into the barrel of the extruder.

In a check valve system of the described ball-bearing type, if the operator in the start-up operation turns the fluid feed (blowing agent) on very slowly, the blowing agent will be warmed before reaching the molten resin present within the valve body and the system may function properly. Similarly, if the valve seat leaks the molten resin in the extruder barrel may never enter the check valve and the system will function. However, any momentary loss of fluid pressure provides a reverse flow through a leaky check valve which, particularly in the case of use of a fluid such as pentane, could create hazardous conditions.

The minimizing or obviation of such undesired problems encountered with check valves of the ball-bearing type are objects of the present invention.

SUMMARY OF THE INVENTION

It is a principal object of the present invention to provide a check valve assembly which, when used in conjunction with a polymeric foam extrusion apparatus, will not become clogged with resin and thereby be prevented from operating in its intended manner. This is accomplished by providing a mechanism which checks the flow of the resin (a high viscosity medium) instead of the blowing agent (a low viscosity medium).

Typical thermoplastic resins from which a foamed article can be produced may include polyethylene, polypropylene, polystyrene, polyurethane, ethylene-vinylacetate, and so forth. Such materials, when in a melted state and at temperatures and shear rates normally encountered in extrusion apparatus, normally exhibit viscosities in the range of 10–1,000,000 poise (gm/cm sec.). Usual blowing agents, whether gaseous (e.g. $N_2$, Ne, Ar, He, $CO_2$) or liquified gas (e.g. pentane), when in the feed inlet line of the check valve, will normally exhibit viscosities in the range of 0.00005–0.05 poise (gm/cm sec.). By taking advantage of such wide differences in viscosity, and hence relative resistance to flow, the present invention provides a mechanism which is superior to that previously used and which is not prone to the problems discussed above.

Essentially, the present invention comprises a valve system comprising a housing, having an enlarged internal chamber with a valve stem of the poppet type disposed therein, fluid (blowing agent) inlet means on one end portion of the housing, fluid exit means at the opposite end of the housing, and a conduit (e.g. a metering orifice adapted to regulate the rate of fluid flow through the valve housing) of reduced diameter relative to the diameter of the chamber positioned between the exit means and the enlarged chamber and through which the valve stem passes. A valve seat is formed on the end of the conduit adjacent to the exit means and is dimensioned such that it mates and forms a seal with the valve head, which valve head is positioned at the extremity of the valve stem nearest the exit means (i.e. directed toward the molten resin). Positioning means (e.g. a slide washer) are attached to the opposite terminus of the valve stem and are used to locate the stem radially within the enlarged chamber. Disposed between the positioning means and the conduit of reduced diameter are tensioning means (e.g. a spiral-type spring surrounding the valve stem) adapted to hold the valve head firmly against the valve seat when the valve is in closed condition.

Thus, when taken in combination with the barrel of an extruder, a major difference between the previously used ball-bearing type check valve and the valve system of the instant invention is the location of the valve seat. In the ball-bearing type valve assembly, the spring and the metering orifice are on the resin side of the valve seat and hence tend to inhibit the action of the valve should molten resin enter the valve assembly. In the poppet-type valve system as embodied herein, the spring and the orifice are on the blowing agent fluid side of the valve seat and thereby allow the valve to act freely since they cannot come in contact with the molten resin.

BRIEF DESCRIPTION OF THE DRAWINGS

The above and other objects and features of the present invention will become apparent from the following description of the preferred embodiments, taken with reference to the accompanying drawings in which.

DESCRIPTION OF THE PREFERRED EMBODIMENT

Figure 1:
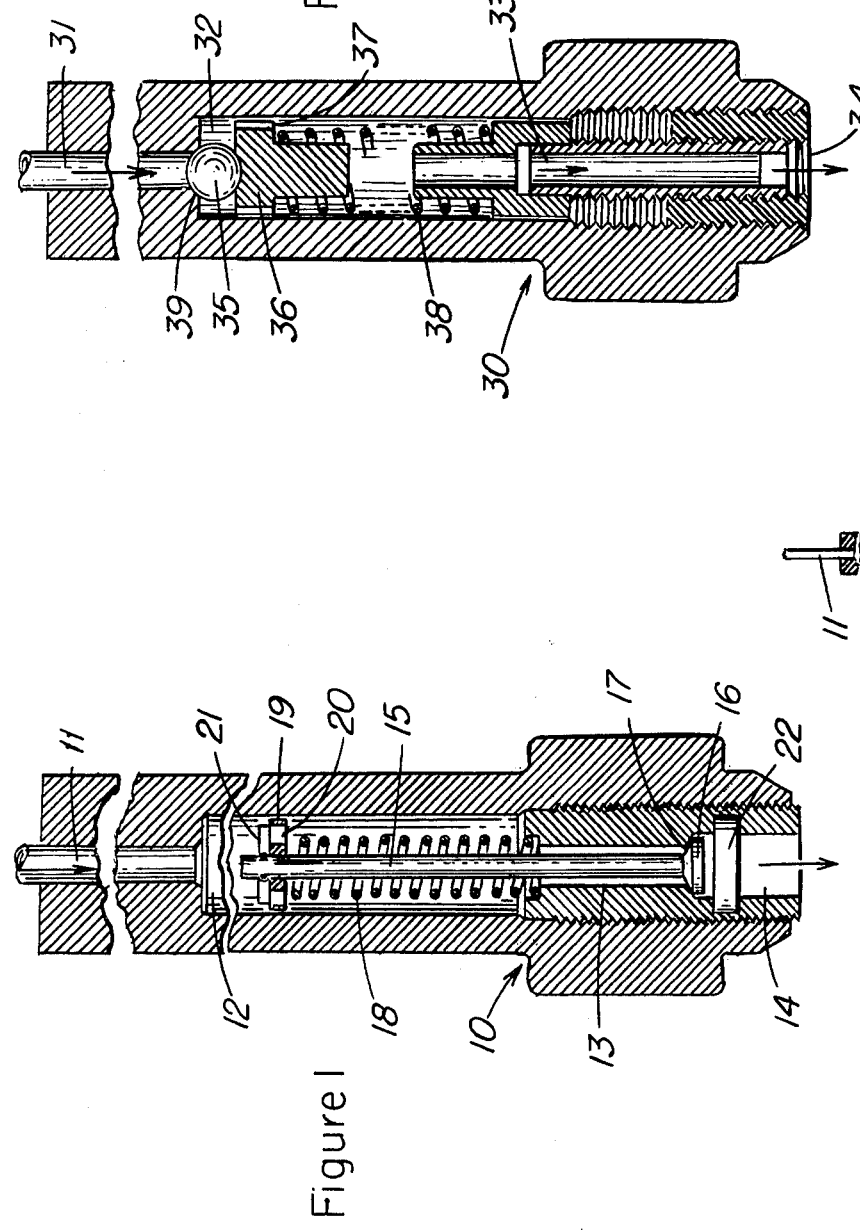
FIG. 1 is a longitudinal sectional view of a poppet-type check valve assembly in accord with the present invention.

The instant invention can best be explained with reference to FIG. 1 of the drawings. The valve mechanism is contained within valve housing 10, the valve body preferably being of suitable exterior configuration such that it plugs directly into the barrel of the foam extrusion unit. Blowing agent fluid is introduced via feed inlet 11 to enlarged chamber 12 of the valve. The fluid then commences to flow through chamber 12, into metering orifice 13 and out via exit 14, from whence it enters the barrel of an extrusion unit and is mixed with molten polymeric resin.

The valve system within housing 10 comprises valve stem 15 to which is affixed valve head 16 at one end and positioning means 19 (e.g. a slide washer) at the other. Stem 15 passes through metering orifice 13, the orifice being a conduit of reduced diameter relative to the diameter of chamber 12. At the end of the orifice 13 nearest to exit 14 is valve seat 17, which is adapted to match and form a seal with valve head 16. Positioning means 19 locates the rear terminus of stem 15 radially within chamber 12 such that the stem is restricted to longitudinal movement within the barrel and lateral movement therein is minimized. Means 19 has openings 20, which allow the fluid to pass through without disruption of flow, and is retained on stem 15 by suitable means, such as the retention pin 21. Another function of positioning means 19 is to provide a suitable means by which tensioning means 18 can hold the valve head 16 firmly against valve seat 17, thereby preventing the fluid from passing through the valve and into the extrusion unit when such action is desired. Limit pin 22 is positioned slightly forward of valve head 16 to limit the forward movement of the stem in the event of a surge of pressure from fluid feed inlet 11.

Figure 2:
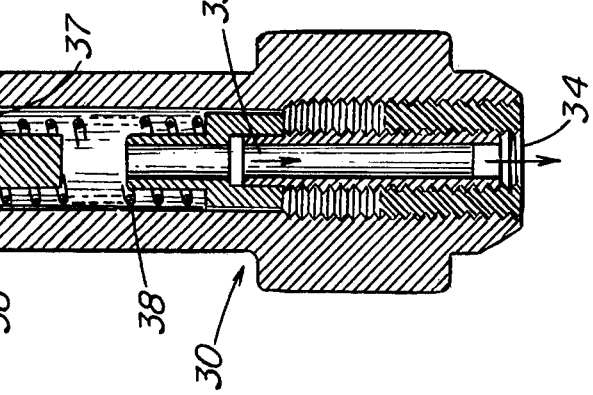
FIG. 2 is a longitudinal sectional view of a typical heretofore employed ball-bearing type check valve assembly.

FIG. 2 illustrates a check valve typical of the ball-bearing type system heretofore used in foam extrusion units. In such a system the housing of the check valve 30 is substantially the same on the outside as the housing of the present poppet-type check valve and is attached to the extrusion unit in substantially the same manner. In such "ball-type" valve, the blowing agent fluid is introduced through feed inlet 31 and is immediately confronted by ball 35. Ball 35, which is positioned on ball follower 36, is held against seat 39 by the action of spring 38 pressing against the follower. When the pressure on the ball from the fluid within inlet 31 exceeds the force holding the ball against its seat, the ball will move away from the seat slightly and the fluid will pass through the throttle, into chamber 32, through openings 37 in the follower, and subsequently through metering orifice 33 and out exit 34 to be mixed with the molten resin in the barrel of the extrusion unit.

Figure 3:
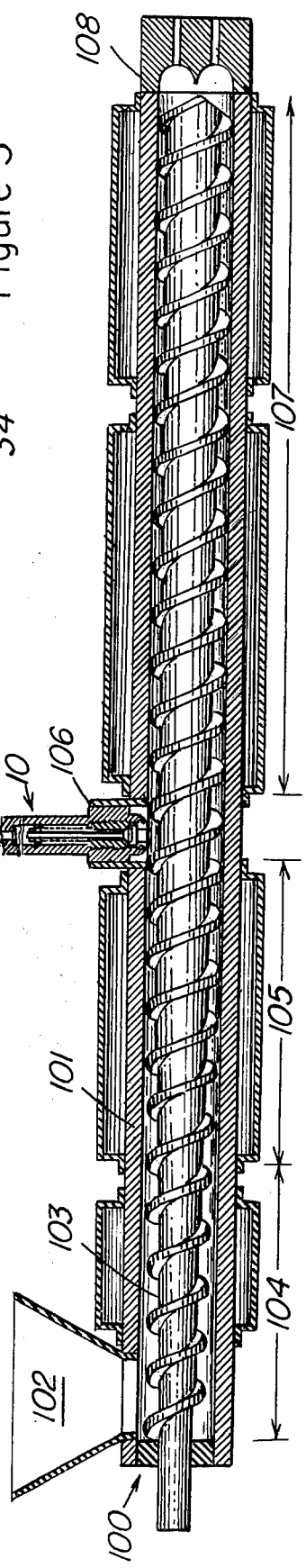
FIG. 3 is a schematic view of a typical illustrative screw extrusion apparatus utilizing the poppet-type check valve of the present invention.

The use of the poppet-type valve, as embodied herein, and its advantages over the ball-type valve as shown in FIG. 2, can be seen with reference to FIG. 3 of the drawings. A typical foam extrusion unit 100 is shown with a poppet-type valve 10 installed in the fluid injection port 106 of the barrel of the extruder.

Generally, the extruder assembly is of conventional type and comprises a barrel 101 with a resin feed hopper 102 at one end, an extrusion head 108 at the opposite end, and an externally driven screw 103 to move resin from the feed hopper through the barrel to the extrusion head. The unit also has various heating elements to melt the resin and keep it melted as it travels the length of barrel 101, and an injection port 106 for the introduction of the fluid blowing agent (e.g. pentane) into the unit.

The solid resin is introduced via hopper 102 into feed zone 104 of the barrel and is carried by screw 103 to melting zone 105 where it is heated and melted. By the time it reaches injection port 106 it is molten and ready to be mixed with the blowing agent. The blowing agent is fed through line 11 to valve 10 (see FIG. 1 for a detailed illustration of the valve assembly of FIG. 3). When the pressure of the (blowing agent) fluid in valve 10 exceeds the pressure within the unit by an amount sufficient to overcome tensioning means 18, the fluid will cause the valve stem to move forward slightly, thereby moving valve head 16 away from its seat 17 and allowing the fluid to enter the unit. Upon entering barrel 101, the fluid is mixed with the molten resin in mixing zone 107 while the mixture is being progressed through the unit by the screw. When the resin-blowing agent mixture reaches extrusion head 108 it is forced out of the openings in the head and, upon contact with the lower pressure area outside the unit, the blowing agent expands and cools the resin to form a solid foam.

The advantages of the poppet-type valve become evident when the unit is shut-down and subsequently restarted. On start-up the entire unit is first brought to temperature and allowed to equilibrate. At this point the ball-type valve would be empty since there is nothing to hold the blowing agent inside it. The present poppet-type valve, with its valve head and valve seat positioned near the exit end of the body, would remain filled with blowing agent. Resin is introduced into the extruder via hopper 102 and is melted as it makes its way toward the extrusion head 108. As the molten resin reaches injection port 106, the fluid (blowing agent) pressure is turned on and blowing agent begins to flow into barrel 101 of the extruder 100. Frequently, the molten resin may reach the injection port 106 before the fluid introduced into valve 10 begins to flow and enter the injection port. With the previously used ball-type valve, the molten resin would thus fill the inside of the valve body and, when the valve subsequently opened to admit the fluid, the resin would be cooled and form a solid plug of material which was too large to be pushed back out the metering orifice and into the barrel of the extruder.

By contrast, with the poppet-type valve embodied herein the molten resin in the barrel of the extruder can only enter the exit port 14 and is prevented from going up past the valve head 16. Thus, even if a leaky valve seat results in the fluid escaping from the valve and leaving the chamber 12 empty, the molten resin, being much more viscous then the blowing agent fluid, is successfully held back and cannot enter the valve housing and interfere with the mechanism. When the fluid begins to flow there is only a small plug of material formed in the injection port and this is easily expelled by the pressure of the blowing agent fluid. The fluid and molten resin then continue through the mixing zone 107 to be thoroughly mixed and forced out the extrusion head 108.

A potentially more serious situation exists when there is a momentary interruption in the flow of blowing agent during operation of the unit, especially if there is also a substantial drop in pressure within the fluid feed line. In such a situation the molten resin, which is now under pressure in the extruder barrel, would quickly fill the previously used ball-type valve whereupon there was a high likelihood that it would force its way around a leaky ball-type valve and enter the fluid feed line where it would solidify, necessitating extensive repairs to get the unit back on stream. Contrarily, the poppet-type valve as embodied herein prevents the molten resin from entering the mechanism and, in addition, the valve seal is enhanced by the relatively viscous resin pressing against the flat valve head instead of being breached as with the spherical ball-type valve.

Having thus described my invention, I claim:

1. A check valve assembly adapted for controlling flow of a fluid blowing agent into an apparatus for the extrusion of polymeric foam resin, said valve comprising:
   (a) a housing with an entry means on one end portion for feed of a fluid blowing agent into said housing, exit means on the opposite end portion of said housing for exiting of said blowing agent from said housing, and an enlarged chamber in said housing between said entry means and exit means;
   (b) a conduit of reduced diameter, relative to the diameter of said exit means, positioned inside said housing in the vicinity of said exit means and having a valve seat formed thereon facing said exit means;
   (c) a poppet valve stem extending through said conduit of reduced diameter into said chamber and having thereon a valve head, positioned at the extremity of said stem nearest said exit means, said head being formed such that when in contact with said valve seat it forms a seal therewith;
   (d) positioning means, disposed on the end of said valve stem opposite said valve head, adapted to position said valve stem radially within said chamber; and
   (e) tensioning means, disposed between said positioning means and said conduit of reduced diameter, adapted for holding said valve head firmly against said valve seat and responsive to the pressure of the fluid blowing agent entering said valve assembly such that said valve head is moved away from said valve seat when the pressure of the entering fluid is greater than the combined force exerted on the valve head by the tensioning means and the pressure within such extrusion apparatus.

2. The check valve assembly of claim 1 further comprising means, positioned in said exit means, to limit the forward movement of said valve head and thereby limit the amount said valve may open.

3. The check valve assembly of claim 1 wherein said positioning means is a slide washer containing openings to facilitate the passage of said fluid blowing agent therethrough.

4. The check valve assembly of claim 1 wherein said conduit of reduced diameter comprises a metering orifice adapted to regulate the rate of fluid flow through said valve.

5. The check valve assembly of claim 1 wherein said tensioning means is a spring disposed around said stem in spiral fashion.

6. The check valve assembly of claim 1 having means operable for direct attachment to the barrel of an extruder apparatus for the extrusion of polymeric foam resin.

7. An apparatus for producing a foamed polymeric resin article comprising an extruder including:
   (a) a barrel through which a polymeric resin is fed while being melted;
   (b) an extrusion head attached to said barrel to extrude said molten resin from said barrel to a lower pressure area; and
   (c) an injection means to inject a fluid blowing agent into said molten resin in said barrel, through an injection port in said barrel, whereby said polymeric resin article is formed by extruding the mixture of said blowing agent with said molten resin through said extrusion head; said injection means comprising a check valve assembly which further comprises (1) a housing with an entry means on one end portion for feed of a fluid blowing agent into said housing, exit means on the opposite end portion of said housing for exiting of said blowing agent from said housing and into the barrel of the extruder, and an enlarged chamber in said housing between said entry means and exit means;

(2) a conduit of reduced diameter, relative to the diameter of said exit means, positioned inside said housing in the vicinity of said exit means and having a valve seat formed thereon facing said exit means;

(3) a poppet valve stem extending through said conduit of reduced diameter into said chamber and having thereon a valve head positioned at the extremity of said stem nearest said exit means, said head being formed such that when in contact with said valve seat it forms a seal therewith;

(4) positioning means, disposed on the end of said valve stem opposite said valve head, adapted to position said valve stem radially within said chamber; and (5) tensioning means, disposed between said positioning means and said conduit of reduced diameter, adapted for holding said valve head firmly against said valve seat and responsive to the pressure of the fluid blowing agent entering said valve assembly such that said valve head is moved away from said valve seat when the pressure of the entering fluid is greater than the combined force exerted on the valve head by the tensioning means and the pressure within the barrel of the extrusion apparatus.

8. The apparatus of claim 7 in which the check valve assembly further comprises means, positioned in said exit means, to limit the forward movement of said valve head and thereby limit the amount said valve may open.

9. The apparatus of claim 7 wherein the positioning means in said check valve assembly is a slide washer containing openings to facilitate the passage of said fluid blowing agent therethrough.

10. The apparatus of claim 7 wherein the conduit of reduced diameter in said check valve comprises a metering orifice adapted to regulate the rate of fluid flow through said valve.

11. The apparatus of claim 7 wherein the tensioning means in said check valve assembly is a spring disposed around said stem in spiral fashion.

* * * * *